(12) United States Patent
Mochizuki

(10) Patent No.: US 6,474,444 B1
(45) Date of Patent: Nov. 5, 2002

(54) TAPER ROLLER BEARING LUBRICATING STRUCTURE

(75) Inventor: Shinichi Mochizuki, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/621,349

(22) Filed: Jul. 21, 2000

(30) Foreign Application Priority Data

Sep. 20, 1999 (JP) .......................... 11-265120

(51) Int. Cl.[7] .............................. F16H 57/04
(52) U.S. Cl. .................. 184/6.12; 384/462; 384/473; 74/467
(58) Field of Search ................ 184/11.1, 11.2, 184/13.1, 6.12; 74/467; 384/462, 464, 473

(56) References Cited

U.S. PATENT DOCUMENTS

| | | | |
|---|---|---|---|
| 2,240,118 A | | 4/1941 | Matthews .................. 184/11 |
| 2,654,441 A | | 10/1953 | Orr et al. .................. 184/11 |
| 4,494,638 A | | 1/1985 | Zenker .................. 192/48.91 |
| 4,541,738 A | * | 9/1985 | Leibensperger et al. ... 184/6.22 |
| 4,597,679 A | * | 7/1986 | Wlodkowski ............... 384/462 |
| 4,656,885 A | * | 4/1987 | Hori et al. .................. 74/467 |
| 4,677,871 A | | 7/1987 | Taniyama et al. ............ 74/467 |
| 4,739,678 A | * | 4/1988 | Miura et al. .................. 74/467 |
| 5,232,291 A | * | 8/1993 | Juan .......................... 74/467 |
| 5,520,468 A | | 5/1996 | Iguchi ...................... 384/473 |
| 5,553,927 A | * | 9/1996 | Mastrangelo ............ 301/124.1 |
| 5,597,370 A | * | 1/1997 | Nogle ........................ 74/467 |
| 5,904,427 A | * | 5/1999 | Braun et al. ................ 384/473 |

FOREIGN PATENT DOCUMENTS

| | | |
|---|---|---|
| GB | 606813 | 8/1948 |
| JP | 2-89871 | 3/1990 |
| JP | 02089871 | 3/1990 |
| JP | 07208586 | 8/1995 |
| JP | 8-86348 | 4/1996 |
| JP | 09105450 | 4/1997 |
| JP | 10047360 | 2/1998 |
| JP | 11-270565 | 10/1999 |

* cited by examiner

*Primary Examiner*—Chong H. Kim
(74) *Attorney, Agent, or Firm*—Foley & Lardner

(57) ABSTRACT

A lubricating structure for an automatic transmission includes a dam defining an oil reservoir for storing a lubricating oil and lubricating a taper roller bearing. The oil reservoir is located in an annualr space between a non-rotational hollow cylindrical member and a boss of an output gear. The taper roller bearing is located axially between the output gear and the dam. The dam has such a height as to immerse part or all of the end of each taper roller at a lowest position.

7 Claims, 7 Drawing Sheets

TAPER ROLLER BEARING LUBRICATING STRUCTURE

BACKGROUND OF THE INVENTION

The present invention relates to a taper roller bearing lubricating structure in a transmission, and more specifically to a taper roller bearing lubricating structure for supporting an output gear in an automatic transmission for motor vehicles.

A Japanese Patent Kokai Publication No. H2(1990)-89871 shows a conventional lubricating structure for an automatic transmission.

Figure 7:
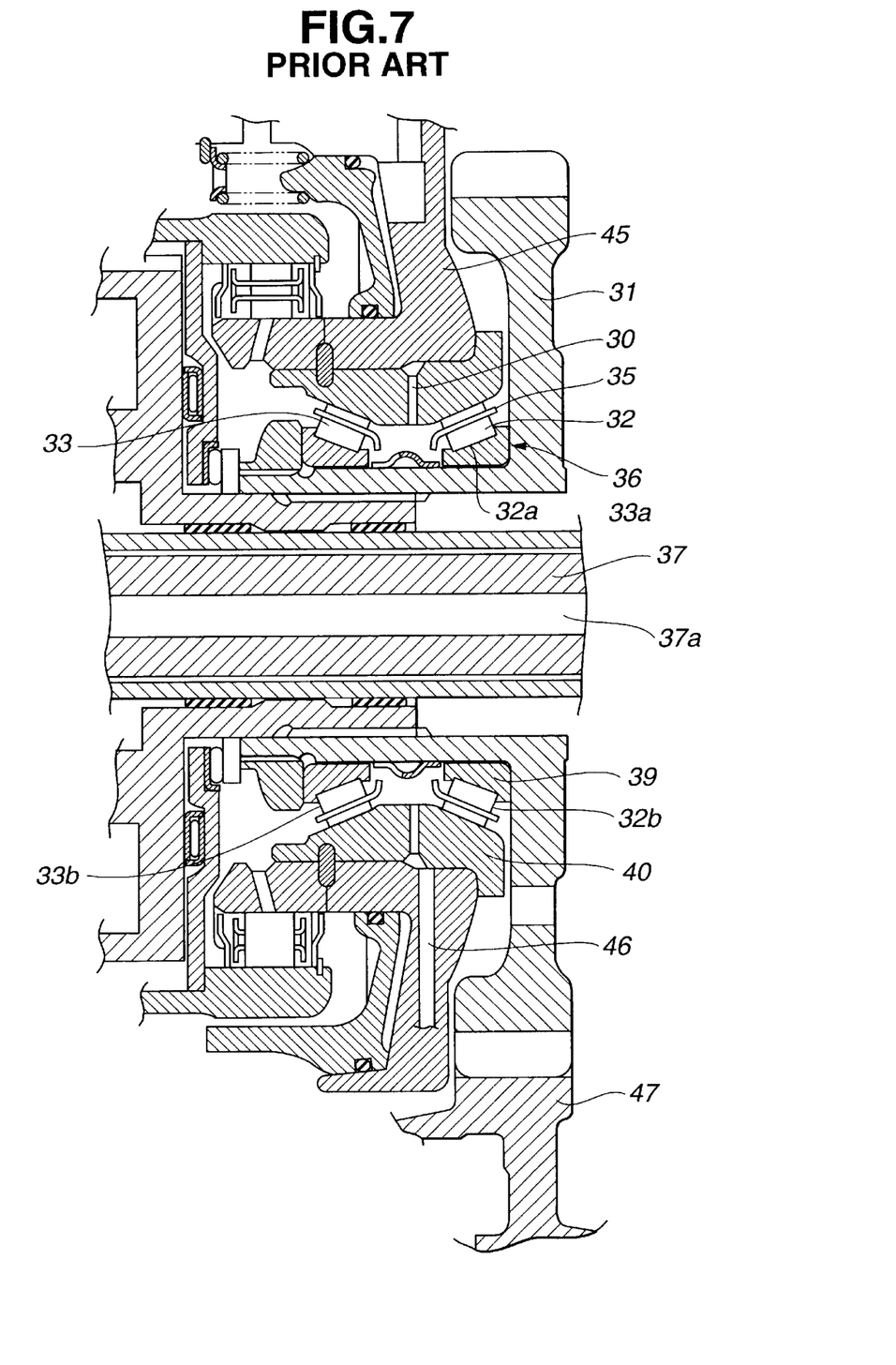
FIG. 7 is a view showing a conventional structure.

In this structure, as shown in FIG. 7, a taper roller bearing 36 rotatably supports, on a partition wall 45, an output gear 31 which endures a great torque on the output side of a planetary gear system. Each of tapered rollers 32 and 33 can support a load acting in the radial direction with its rolling contact surface 32a or 33a along a line instead of a point as in a ball bearing. A load in a thrust direction can be supported by the rolling contact surface 32a or 32b and the end surface 32b or 33b of each tapered roller 32 or 33 together with an inner lace 39 contacting with these surfaces.

An oil passage 30 is formed in an outer race 40, for lubricating the tapered rollers 32 and 33.

SUMMARY OF THE INVENTION

This conventional lubricating structure has an oil passage 46 specifically formed in the partition wall 45, for lubrication of the taper roller bearing 36. However, according to our findings, the lubrication for the tapered rollers 33 still tends to be insufficient, specifically in the end surfaces 33b of the tapered rollers 33 on the side remoter from the output gear 31.

It is an object of the invention to provide a taper roller bearing lubricating structure capable of supplying sufficient lubricating oil to tapered rollers without complicating the manufacturing process.

It is another object of the invention to provide a taper roller bearing lubricating structure capable of supplying sufficient lubricating oil specifically to tapered rollers remote from an output gear without complicating the manufacturing process.

According to the present invention, a lubricating structure for an automatic transmission comprises:

an output gear having a gear portion for delivering an output rotation of the automatic transmission, and a hollow boss;

an inner rotating shaft disposed inside the boss of the output gear and formed with a lubricating oil passage;

a taper roller bearing disposed around the boss of the output gear;

an outer support surrounding and supporting the taper roller bearing; and a dam forming an oil reservoir for storing a lubricating oil from the oil passage in the rotating shaft, the oil reservoir being formed radially between the boss of the output gear and the outer support, and axially between the dam and the taper roller bearing which is located axially between the gear portion of the output gear and the dam.

According to another aspect of the present invention, an automatic transmission comprises:

an output gear having a gear portion for delivering an output rotation of the automatic transmission, and a hollow boss;

a taper roller bearing having a plurality of tapered rollers arranged around the boss of the output gear;

an inner rotating shaft received inside the boss of the output gear and formed with a lubricating oil passage; and an outer non-rotational annular portion surrounding and supporting the taper roller bearing; and a dam forming an oil reservoir for storing a lubricating oil supplied from the oil passage in the inner rotating shaft, the dam extending from the annular portion radially inwardly to a projecting dam end located on an imaginary cylindrical surface which passes through the tapered rollers.

DETAILED DESCRIPTION OF THE INVENTION

Figure 1:
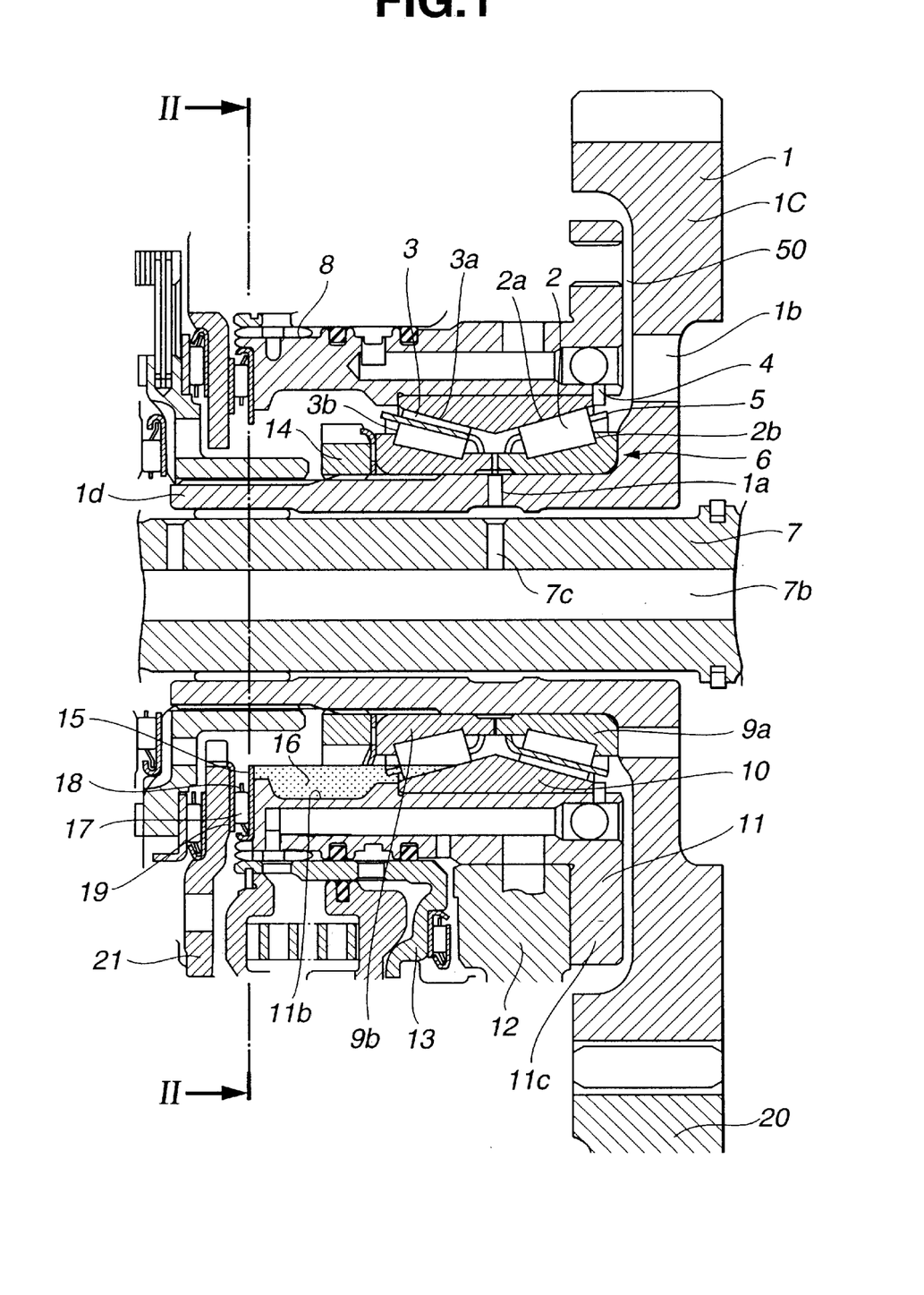
FIG. 1 is a sectional view showing a taper roller bearing lubricating structure according to a first embodiment of the present invention.

FIG. 1 shows a taper roller bearing lubricating structure according to a first embodiment of the present invention.

Rotation received from an input shaft 7 is transmitted to an output gear 1 through a planetary gear system having one or more planetary gearings. The output gear 1 engages with a reduction gear 20, and is rotatably supported by a taper roller bearing 6.

The output gear 1 has a gear portion 1c in the form of a toothed wheel, and a center hollow boss 1d projecting from the center of the gear portion 1c in a first axial direction which is a leftward direction as viewed in FIG. 1.

The input shaft 7 is rotatable in the hollow boss 1d of the output gear 1, and has therein an axial oil passage 7b and a radial oil passage 7c.

The taper roller bearing 6 is disposed around the boss 1d of the output gear 1. The taper roller bearing 6 has a first set of first tapered rollers 2 closer to the gear portion 1c of the output gear 1 and a second set of second tapered rollers 3 remoter from the gear portion 1c of the output gear 1. The first and second tapered rollers 2 and 3 are disposed between an inner race 9 and an outer race 10, and arranged to allow the inner and outer races 9 and 10 to rotate relative to each other. The tapered rollers 2 and 3 of each of the first and second sets are arranged around the center axis of the taper roller bearing 6 and the output gear 1, and held at regular intervals by a holder 5.

The outer race 10 of the taper roller bearing 6 is supported by a non-rotational member which, in this example, includes a drum support 11 and a case having a partition wall 12. The outer race 10 is fixed to the drum support 11. A snap ring 4 limits movement of the outer race 10 in a thrust or axial direction. In this example, the drum support 11 has a annular portion 11a surrounding and supporting the taper roller bearing 6, and the drum support 11 and the partition wall 12 serve as an outer support supporting the taper roller bearing 6.

The inner race 9 of the taper roller bearing 6 is fixed to the boss 1d of the output gear 1 with a nut 14. The inner race 9 of this example includes a first inner race 9a for the first tapered rollers 2, and a second inner race 9b for the second tapered rollers 3.

In this way, the taper roller bearing 6 is disposed in an annular space formed between the boss 1d of the output gear 1 and the annular portion 11a of the drum support 11.

A thrust bearing 19 is disposed between the drum support 11 and a rotating member 21 of a ring gear so that the rotating member 21 can rotate relative to the drum support 11. The thrust bearing 19 has a set of rollers 17, a holder 18, a first race and a second race 15 attached to the drum support 11. The race 15 projects radially inwardly and thereby defines an oil reservoir 16. The projecting portion of the race 15 serves as a dam for raising the level of oil in the oil reservoir 16.

Preferably, the dam formed by the race 15 is formed entirely around the center axis of the structure. The annular dam extending through 360° around the center axis facilitates the assemblage with its rotation symmetry removing the limitation on the orientation, and catches splashes of oil efficiently.

The annular portion 11a of the drum support 11 has a recess 11b defining the oil reservoir 16. The recess 11b increases the capacity of the oil reservoir 16, and thereby prevents undesired temperature increase of the oil in the reservoir 16. The recess 11b is located axially between the taper roller bearing 6 and the thrust bearing 19. The recess 11b in this example is annular and open radially inwardly toward the center axis. The recess 11b is depressed radially outwardly from the radially inwardly facing inside surface of the annular portion 11a of the drum support 11.

The drum support 11 of this example has an outward flange portion 11c which confronts the gear portion 1c of the output gear 1 and forms a radially extending clearance 50 between the gear portion 1c and the output flange portion 11c.

The thus-constructed structure is assembled in the following sequence.

1. The outer race 10 is inserted into the drum support 11 from the right side as viewed in FIG. 1, and fixed unextractable with the snap ring 4.
2. The first tapered roller set 2 held by the holder 5 and the first inner race 9a are provisionally mounted on the boss 1d of the output gear 1. Then, the boss 1d of the output gear 1 with the provisionally mounted first tapered roller set 2 and the first inner race 9a is inserted into the hollow cylindrical portion 11a of the drum support 11.
3. The second tapered roller set 3 and its inner race 9b held in the holder 5 are inserted from the left side of the output gear 1 as viewed in FIG. 1, and the nut 14 is tightened with a jig through a washer.
4. The drum support 11 is fixed to the partition wall 12 of the case with bolts.

In this assembly process, the race 15 of the thrust bearing 19 is installed after the nut 14 is tightened. Therefore, the race 15, even if projected radially inwardly to raise the oil level in the reservoir 16 sufficiently, is not obstructive to installation and removal of the nut.

The taper roller bearing 6 is lubricated in the following manner.

To the first tapered rollers 2, oil is supplied by a route of the axial oil passage 7b in the input shaft 7, the radial oil passage 7c in the input shaft 7, an oil hole 1a in the boss 1d of the output gear 1, the confronting mating surfaces of the first and second inner races 9a and 9b and the first tapered rollers 2. The oil scattered by the output gear 1 and the reduction gear 20 is also supplied to the first tapered rollers 2 through the clearance 50 which is formed between the gear portion 1c of the output gear 1 and the outward flange portion 11c of the drum support 11, and an axial hole 1b which is formed in the gear portion 1c of the output gear 1. Thus, the rolling contact surface 2a and the end surface 2b of each tapered roller 2 are lubricated by the lubricating oil supplied by these routes.

Figure 2:
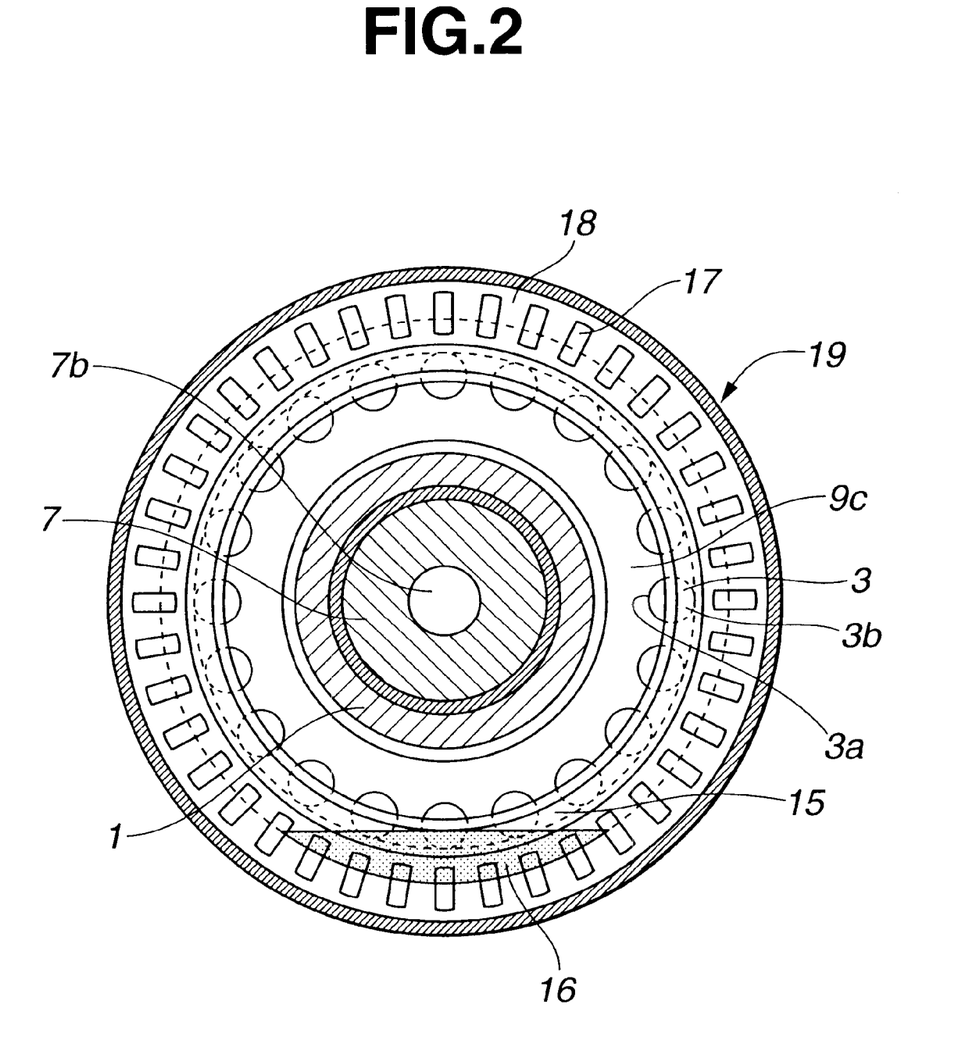
FIG. 2 is a sectional view taken across a line II—II shown in FIG. 1.

The second tapered roller set 3 is supplied with oil by a route of the axial oil passage 7b in the input shaft 7, the radial oil passage 7c in the input shaft 7, the oil hole 1a in the boss 1d of the output gear 1, the mating surfaces of the first and second inner races 9a and 9b, and the second tapered rollers 3. The oil reservoir 16 collects and stores the oil flowing through this route. The rolling contact surfaces and the end surfaces of the second tapered rollers 3 are immersed in the oil in the reservoir 16. Each roller of the second tapered rollers 3 rotates about the center axis of the input shaft 7, and periodically reaches the lowest position in the orbit around the center shaft. At the same time, each roller rotates about its own axis. At the lowest position, the end surface of each tapered roller 3 is immersed in the oil in the reservoir 16, and the tapered roller 3 is lubricated entirely as it rotates on its own axis. FIG. 2 shows, in section taken across a line II—II, the lubricating structure of FIG. 1 in the state in which the nut 14 is omitted and the oil is stored in the oil reservoir 16.

Figure 3A:
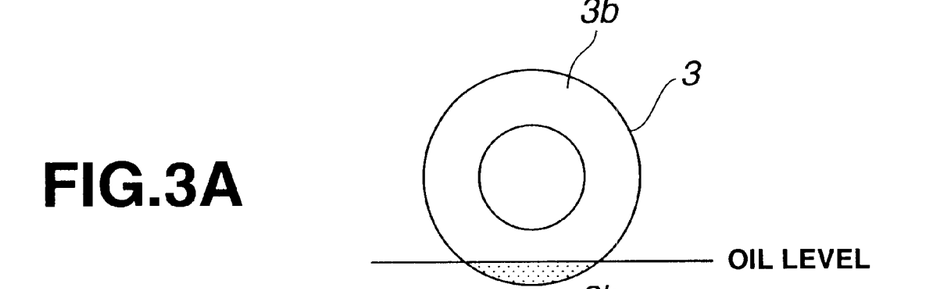
FIGS. 3A, 3B and 3C are schematic sectional views for illustrating oil levels in the structure of FIG. 1.
Figure 3B:
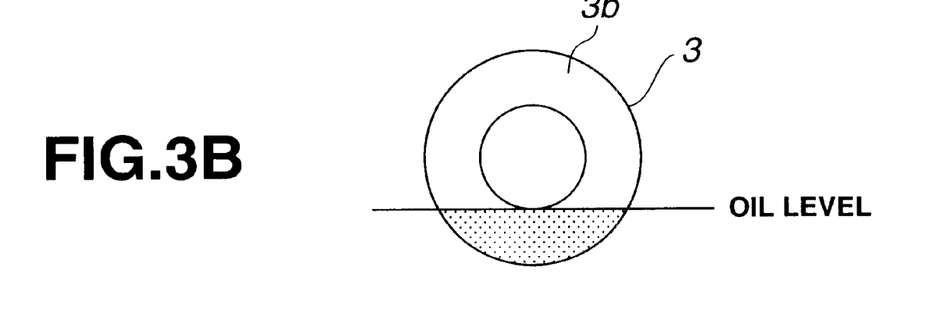
Figure 3C:
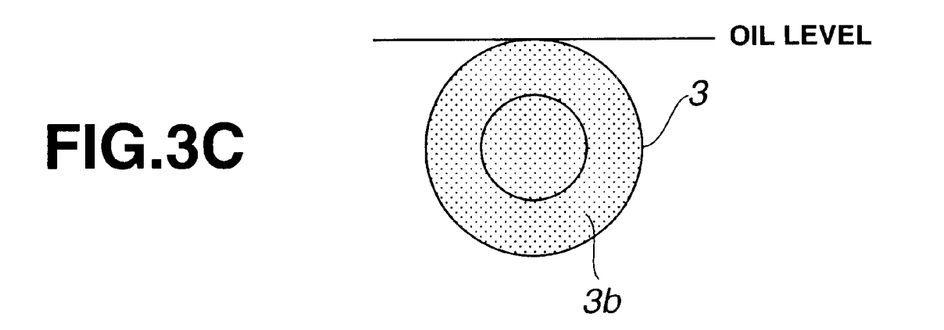

FIGS. 3A, 3B and 3C illustrate three different levels of the oil in the oil reservoir 16. In the case of FIG. 3A, the end surface 3b of one tapered roller 3 at the lowest position is immersed in the oil only in a small part. Each tapered roller 3 has a first end surface facing toward the first tapered rollers 2 and the gear portion 1c of the output gear 1, and a second end surface facing away from the first tapered roller 2 and the gear portion 1c. The end surface 3b is the second end surface facing away from the gear portion 1c. For better lubrication, however, it is desirable that the lower portion of the annular end surface 3b of the tapered roller 3 is entirely immersed in the oil as shown in FIG. 3B. In the case of FIG. 3C, the end surface 3b of the tapered roller at the lowest position is entirely immersed up to the top under the oil surface.

Each tapered roller 3 is in contact with the inner race 9b in the end surface 3b. Therefore, the lubricating structure capable of holding the oil surface at the level of FIG. 3C is preferable for effective lubrication. The end surface 3b of each second tapered roller 3 must bear a load in the thrust or axial direction, and a torque of a great magnitude for limiting movement in the radial direction, so that sufficient lubrication is required. During revolving operation, however, the centrifugal force tends to spin out the oil from the end surface 3b and makes it difficult to lubricate the end surface 3b sufficiently.

The thrust bearing 19 is lubricated by both the oil from the oil hole formed in the carrier and the oil overflowed from the oil reservoir 16. The basic amount of lubrication remains unchanged.

The dam formed by extending the race 15 of the thrust bearing 19 is advantageous in the ease of fabrication.

The reservoir 16 is formed at such a position that the taper roller bearing 6 is located axially between the gear portion 1c of the output gear 1 and the reservoir 16. The reservoir 16 on the far side from the gear portion 1c is effective for lubrication since, on the far side, the end surfaces 3b of the second tapered rollers 3 contacting with the inner race 9 and the outer race 10 are hardly lubrication by oil splashed by the output gear 1 and the reduction gear 20.

Figure 4:
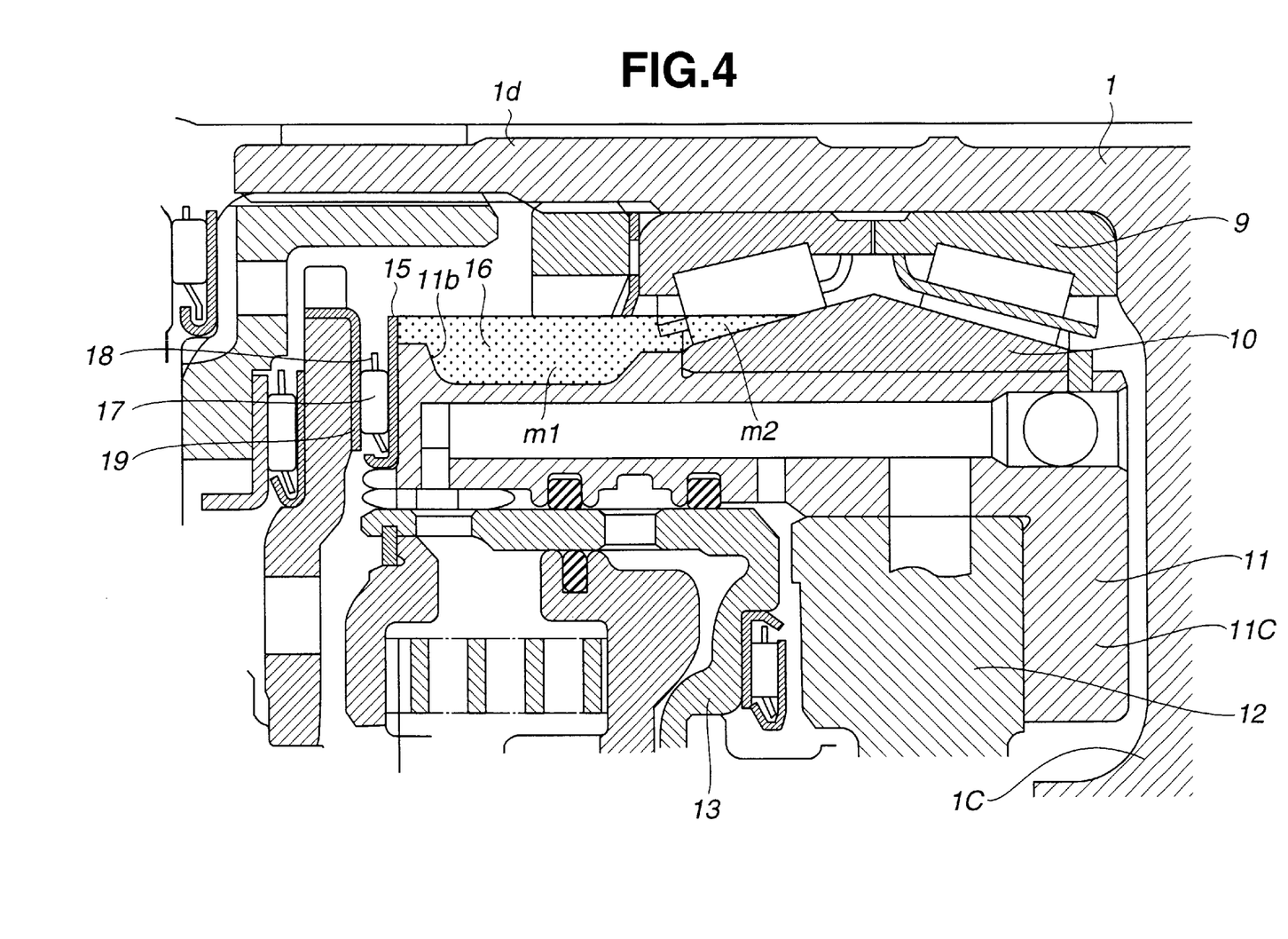
FIG. 4 is an enlarged sectional view showing a part of the structure of FIG. 1.
Figure 5:
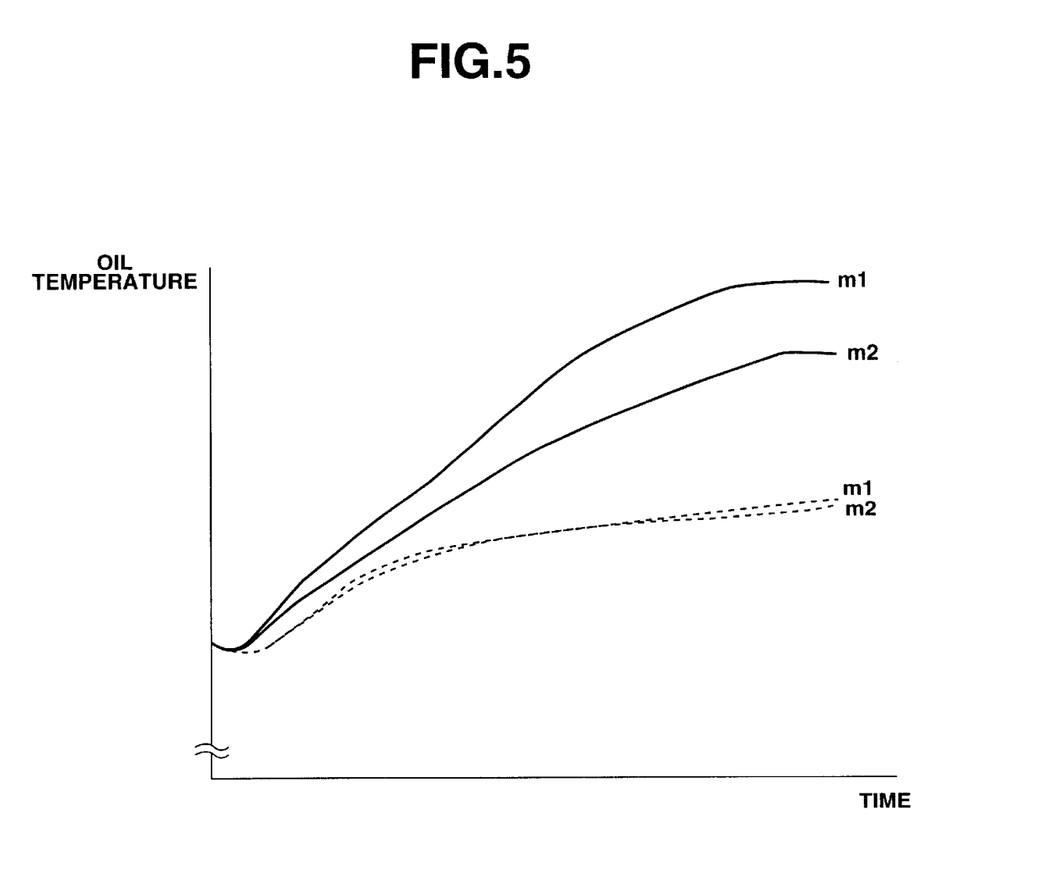
FIG. 5 is a graph showing the results of experiments of measuring the temperature at positions shown in FIG. 4.

The lubricating structure according to this embodiment can prevent burning and improve durability by effectively lubricating contact surfaces and thereby preventing temperature increase. FIGS. 4 and 5 shows the results of experiments. FIG. 4 shows the oil reservoir 16 holding the oil level shown in FIG. 3B. FIG. 5 shows the results of temperature measurement at a first position ml and a second position m2 shown in FIG. 4. In FIG. 5, solid lines represent temperature values before the dam is formed, and dotted lines represent temperature values after the dam is formed. The test was conducted with the input rotation at 6,000 rpm, and the line pressure at its maximum.

As shown by the dotted lines in FIG. 5, the oil temperature is stabilized at a lower level approximately ⅔ lower in the example of the first measuring point m1, and ¾ lower in the example of the second measuring point m2 than the levels of the solid lines of the structure without the dam.

As evident from the experimental results, the oil reservoir 16 formed by the dam is effective for lubricating the rolling contact surfaces 3a and the end surfaces 3b even under severe conditions.

Figure 6:
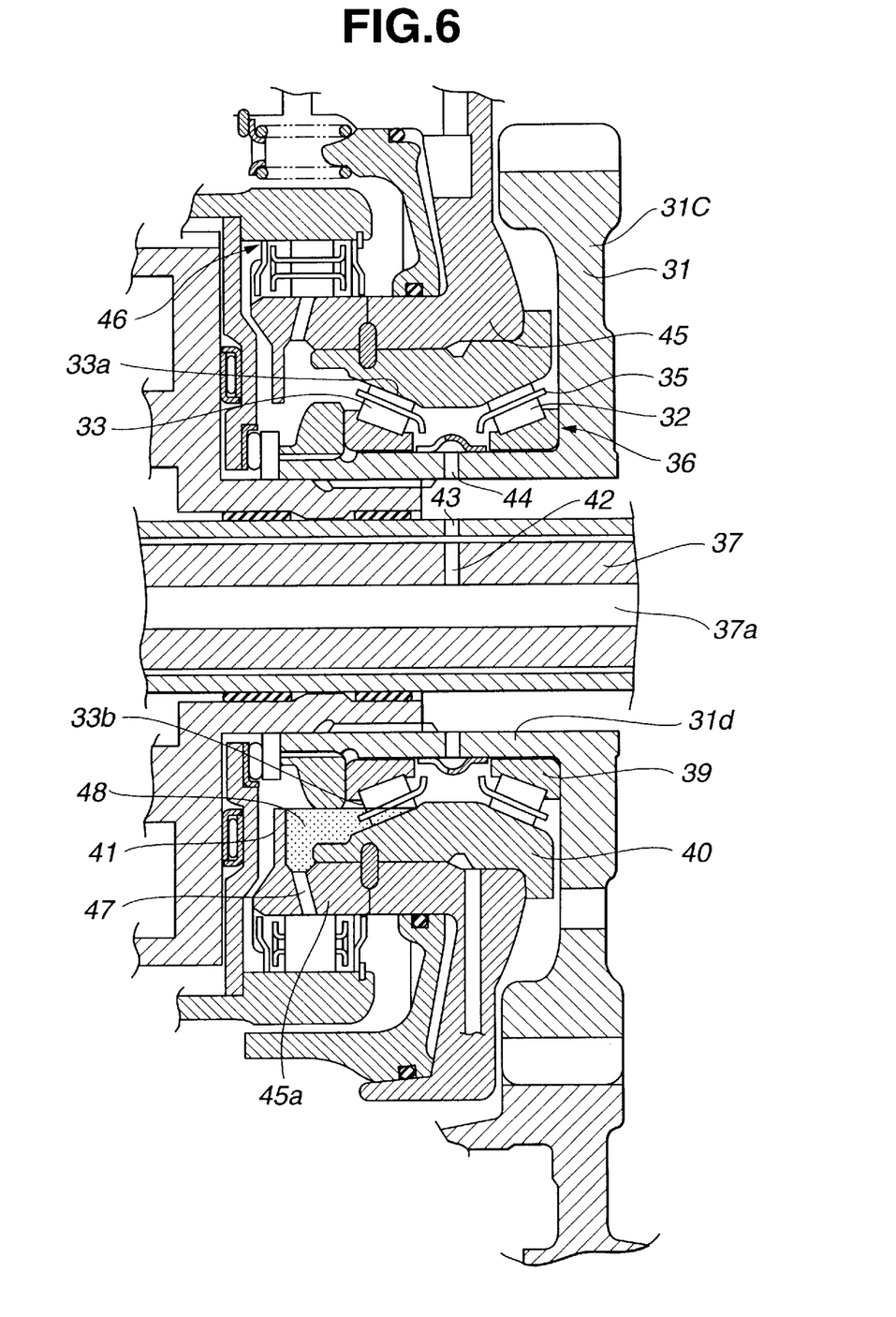
FIG. 6 is a sectional view showing a taper roller bearing lubricating structure according to a second embodiment of the present invention.

FIG. 6 shows a taper roller bearing lubricating structure according to a second embodiment of the present invention.

Like the structure of FIG. 1, the lubricating structure shown in FIG. 6 includes an output gear 31 having a gear portion 31c and a hollow central boss 31d, a center input shaft 37 having an axial hole 37a for oil passage, a taper roller bearing 36 having first and second roller sets 32 and 33, first and second inner races, respectively, for the first and second roller sets 32 and 33, a common outer race 40 common to the first and second roller sets 32 and 33, and first and second holders 35, respectively, for the first and second roller sets 32 and 33. A stationary axle case has a partition wall 45 having a hollow cylindrical portion 45a projecting from the partition wall 45 in an axial direction away from the gear portion 31a of the output gear 31.

The outer race 40 of the taper roller bearing 36 is fixedly supported by the partition wall 45 formed in the axle case. On the opposite side of the taper roller bearing 36, to the output gear 31, the partition wall 45 has an annular inward projection 41 serving as a dam for forming an oil reservoir 48. The taper roller bearing 36 is located between the gear portion 31c of the output gear 31 and the dam 41, axially along the axial direction of the coaxial structure of the output gear 31, the taper roller bearing 36 and the input shaft 37. The dam 41 has such a height as to immerse the lower portion in the end surface 33b of each roller 33 of the second roller set of the taper roller bearing 36 in the oil in the reservoir 48. The cylindrical portion 45a of the partition wall 45 is formed with at least one fourth oil passage 47 at an axial location between the taper roller bearing 36 and the dam 41. The fourth oil passage 47 extends from the oil reservoir 48 radially outwardly to an outside end opening toward a one-way clutch 46 disposed around the cylindrical portion 45a, and thereby directs the oil from the oil reservoir 48 to the one-way clutch 46 for lubrication.

The first and the second tapered rollers 32 and 33 are supplied with the lubricating oil by the route of the axial oil passage 37a in the input shaft 37, a first (radial) oil passage 42 in the input shaft 37, a second (radial) oil passage 43 in a hollow shaft receiving therein the input shaft 37, and a third (radial) passage 44 formed in the boss 31d of the output gear 31.

The oil reservoir 48 collects and stores the thussupplied oil, and lubricates the rolling contact surfaces 33a and the end surfaces 33b of the second tapered rollers 33.

The oil stored in the oil reservoir 48 passes the fourth oil passage 47 and reaches the one-way clutch 46 for lubrication.

In the practical example of FIG. 6, the one-way clutch 46 is disposed around the hollow cylindrical portion 45a of the partition wall 45, and the hollow cylindrical portion 45a serves as an inner race for the one-way clutch 46. The dam 41 is an annular inward projection formed integrally in the hollow cylindrical portion 45a of the partition wall 45. The hollow cylindrical portion 45a as the inner race of the one-way clutch 46 has the radial oil passage 47 extending from the radial inner side to the radial outer side, so that the one-way clutch 46 is lubricated sufficiently.

The outer race 40 in the example of FIG. 6 is a single block having no oil passages, like the outer race 10 of FIG. 1. Like the outer race 10 of FIG. 1, the outer race 40 in the example of FIG. 6 has a first conical surface for the first rollers 32 and a second conical surface for the second rollers 33. The first conical surface flares or becomes lager in sectional size from the axial middle of the outer race 40 toward the gear portion 31c. The second conical surface flares from the axial middle of the outer race 40 toward the reservoir 48. At the lowest position, the second conical surface is immersed at least in part in the oil in the reservoir 48. In the example of FIG. 6, the reservoir 48 is defined by the projection 41, the outer race 40 and a recess formed in the cylindrical portion 45a of the partition wall 45.

What is claimed is:

1. A lubricating structure for an automatic transmission, the lubricating structure comprising:
    an output gear having a gear portion for delivering an output rotation of the automatic transmission, and a hollow boss;
    an inner rotating shaft disposed inside the boss of the output gear and formed with a lubricating oil passage;
    a taper roller bearing disposed around the boss of the output gear;
    an outer support surrounding and supporting the taper roller bearing; and
    a dam forming an oil reservoir for storing a lubricating oil from the oil passage in the rotating shaft, the oil reservoir being formed radially between the boss of the output gear and the outer support, and axially between the dam and the taper roller bearing which is located axially between the gear portion of the output gear and the reservoir,
    wherein the outer support and the dam are parts of a non-rotating member, and the dam projects radially inwardly, and
    wherein the lubricating structure further comprises a second bearing, and the dam is an inward extension of a first race of the second bearing, the first race being disposed at an end of the outer support, the inward extension of the first race projecting radially inwardly from the outer support.

2. The lubricating structure as claimed in claim 1, wherein the dam has such a height as to overlap at least a part of an end surface of one of tapered rollers of the taper roller bearing.

3. The lubricating structure as claimed in claim 1, wherein the dam extends to such a level as to overlap the entirety of the end surface of one of the tapered rollers of the taper roller bearing.

4. The lubricating structure as claimed in claim 1, wherein the outer support comprises an inside circumferential surface facing radially inwardly and surrounding the boss of the output gear, and a recess depressed from the inside circumferential surface to form the reservoir, and located axially between the dam and the taper roller bearing.

5. An automatic transmission comprising:
- an output gear having a gear portion for delivering an output rotation of the automatic transmission, and a hollow boss;
- a taper roller bearing having a plurality of tapered rollers arranged around the boss of the output gear;
- an inner rotating shaft received inside the boss of the output gear and formed with a lubricating oil passage; and
- an outer non-rotational annular portion surrounding and supporting the taper roller bearing; and
- a dam forming an oil reservoir for storing a lubricating oil supplied from the oil passage in the inner rotating shaft, the dam extending from the annular portion radially inwardly to a projecting dam end located on an imaginary cylindrical surface which passes through the tapered rollers,
- wherein the dam is located on one side of the taper roller bearing, and the taper roller bearing comprises an outer race having a conical rolling surface whose diameter increases in an axial direction from the taper roller bearing toward the dam, and
- wherein the automatic transmission further comprises a rotating member and a thrust bearing disposed between the rotating member and the non-rotational annular portion, and the thrust bearing has rollers arranged between a first race attached to the rotating member and a second race attached to the non-rotational annular portion, and the dam is an inward projection of the second race.

6. The automatic transmission as claimed in claim 5, wherein the non-rotational annular portion has an inside circumferential surface facing radially inwardly toward the boss of the output gear, and a recess depressed in the inside circumferential surface of the non-rotational annular portion, for defining the oil reservoir.

7. The automatic transmission as claimed in claim 5, wherein the outer race is a single block having no lubricating oil hole and hence blocking oil passage from one of radial outer and inner sides of the outer race to the other side.

* * * * *